US012154531B2

(12) United States Patent
Yamaguchi

(10) Patent No.: US 12,154,531 B2

(45) Date of Patent: Nov. 26, 2024

(54) KEY FOR KEYBOARD DEVICE

(71) Applicant: KABUSHIKI KAISHA KAWAI GAKKI SEISAKUSHO, Hamamatsu (JP)

(72) Inventor: Tsutomu Yamaguchi, Hamamatsu (JP)

(73) Assignee: KABUSHIKI KAISHA KAWAI GAKKI SEISAKUSHO, Hamamatsu (JP)

( * ) Notice: Subject to any disclaimer, the term of this patent is extended or adjusted under 35 U.S.C. 154(b) by 133 days.

(21) Appl. No.: 18/186,860

(22) Filed: Mar. 20, 2023

(65) Prior Publication Data

US 2023/0317034 A1 Oct. 5, 2023

(30) Foreign Application Priority Data

Mar. 30, 2022 (JP) ................................ 2022-056842

(51) Int. Cl.
*G10C 3/12* (2006.01)
*G10H 1/34* (2006.01)

(52) U.S. Cl.
CPC ............... *G10C 3/125* (2013.01); *G10H 1/34* (2013.01); *G10H 2220/265* (2013.01)

(58) Field of Classification Search
CPC ...................................................... G10C 3/125
See application file for complete search history.

(56) References Cited

U.S. PATENT DOCUMENTS

2015/0122108 A1 5/2015 Takata et al.
2023/0098045 A1* 3/2023 Yamaguchi ............ G10H 1/346 84/644
2023/0197045 A1* 6/2023 Shiraishi .................. G10C 3/12 84/423 R
2023/0317034 A1* 10/2023 Yamaguchi ............ G10H 1/346 84/423 R
2023/0317041 A1* 10/2023 Kito ....................... G10H 1/346 84/744

FOREIGN PATENT DOCUMENTS

JP 2018112763 A * 7/2018 ............ G10C 3/125

* cited by examiner

*Primary Examiner* — Robert W Horn
(74) *Attorney, Agent, or Firm* — LEWIS ROCA ROTHGERBER CHRISTIE LLP

(57) ABSTRACT

A key for a keyboard device includes a resin key body and one or a plurality of woody boards attached along at least part of a pair of side portions of the key body. The key body includes an upper portion protrusion which extends along an upper end of each of the side portions and is formed continuous with the top portion, the upper portion protrusion protruding in a lateral direction of the key body. Each woody board is disposed such that an upper end surface thereof is in contact with a lower surface of the upper portion protrusion. The upper portion protrusion has a thickness dimension in a vertical direction smaller than a thickness dimension of the top portion of the key body.

2 Claims, 9 Drawing Sheets

KEY FOR KEYBOARD DEVICE

CROSS-REFERENCE TO RELATED APPLICATION(S)

This application claims priority to Japanese Patent Application Number 2022-056842, filed on Mar. 30, 2022, the entire content of which is incorporated herein by reference.

BACKGROUND OF THE INVENTION

Field of the Invention

The present invention relates to a key for a keyboard device which is applied to a keyboard instrument, such as an electronic piano, and more particularly to a key for a keyboard device which has a woody board attached to a side thereof.

Description of the Related Art

Conventionally, there has been known a key for a keyboard device which has woody boards attached to sides of a key body made of resin so as to impart woody texture to the key at a low cost. For example, in Japanese Laid-Open Patent Publication (Kokai) No. 2018-112763, a key for a keyboard device is disclosed which is comprised of a base member, made of resin, which has a box-like shape with an open lower surface, and a pair of wood members having a rectangular plate-like shape and arranged on left and right sides of the base member, respectively, the thickness of at least one of the pair of wood members being set in a range of 2 mm or more and 14.5 mm or less.

The key for a keyboard device in Japanese Laid-Open Patent Publication (Kokai) No. 2018-112763 is configured such that left and right ends of an upper board of the base member are caused to protrude laterally from respective side boards of the base member such that upper end surfaces of the wood members arranged on the left and right sides of the base member are prevented from being exposed to the outside, and lower surfaces of the left and right protruding ends of the upper board cover the upper end surfaces of the wood members. With this construction, the appearance of the key as viewed laterally is made similar to that of a wooden key, whereby woody texture is imparted to the key.

In this key for the keyboard device, however, since the thickness of the wood members is set to 2 mm or more, the protruding length of the left and right ends of the upper board is also 2 mm or more, and hence, the left and right ends of the upper board largely laterally protrude from the side boards. In the case of the key having such a shape, respective continuous portions between the upper board and the side boards become thicker than the other portions of the upper board, whereby when a resin material is molded, a difference in the cooling rate is caused and the resin material is not contracted uniformly, so that molding defects called sink marks are liable to be generated.

The upper board provides a surface hit by a finger of a player at the time of key depression during musical performance of the player, and hence to prevent the touch feeling and the appearance of the key from being degraded, it is necessary to prevent generation of sink marks as much as possible. Conventionally, to suppress generation of sink marks on the continuous portions between the upper board and the side boards, the counter-measure has been taken to make the side boards thinner than the upper board, thereby reducing the difference in the cooling rate during molding.

However, to effectively suppress generation of sink marks on the upper board, it is required to reduce the thickness of the side boards to approximately half the thickness of the upper board. As described above, to make the appearance of the key as viewed laterally similar to that of the wooden key, it is necessary to reduce the thickness of the upper board to a predetermined level or lower. This, however, brings about a problem that the thickness of the side boards becomes insufficient, causing lowering of rigidity of the key and degradation of key touch feeling.

SUMMARY OF THE INVENTION

It is an object of the present invention to provide a key for a keyboard device which is capable of effectively suppressing generation of sink marks on a top portion of the key without spoiling woody texture of the key, and securing sufficient rigidity of the key, thereby enabling a player to obtain an excellent key touch feeling.

To attain the above object, in a first aspect of the present invention, there is provided a key for a keyboard device, including a key body made of resin, which has at least a top portion and a pair of side portions and extends a predetermined length in a front-rear direction, and at least one or a plurality of woody boards attached along at least part of the pair of side portions of the key body, wherein the key body includes an upper portion protrusion extending along an upper end of each of the pair of side portions and formed continuous with the top portion, the upper portion protrusion protruding in a lateral direction of the key body, wherein the one or each of the woody boards is disposed such that an upper end surface thereof is in contact with a lower surface of the upper portion protrusion, and wherein the upper portion protrusion has a thickness dimension in a vertical direction smaller than a thickness dimension of the top portion of the key body.

With this construction, the upper portion protrusion formed continuous with the top portion of the key body extends such that it protrudes in the lateral direction along the upper end of each side portion of the key body, and one or each of the woody boards is disposed such that the upper end surface thereof is in contact with the lower surface of the upper portion protrusion, whereby the upper end surface of the woody board is covered with the upper portion protrusion so as not to be exposed to the outside.

Further, the upper portion and the upper portion protrusion of the key body are made different in thickness, that is, the thickness dimension in the vertical direction of the upper portion protrusion is made smaller than the thickness dimension of the top portion of the key body, whereby the thickness dimension of the top portion can be set to be larger while an appearance of the key as viewed laterally is made similar to that of a wooden key. With this, even when the thickness dimension of each side portion is reduced to approximately half the thickness dimension of the top portion so as to suppress generation of sink marks on the top portion, it is possible to secure a certain thickness of the side portion, whereby it is possible to secure sufficient rigidity of the key. Further, the upper portion protrusion is formed to be thinner than the top portion, whereby during molding of the key body, a difference in the cooling rate between continuous portions between the top portion and the side portions of the body, and the other portions of the key body is reduced, so that it is possible to further suppress generation of sink marks on the top portion. Therefore, according to the present invention, it is possible to provide a key for a keyboard device which is capable of effectively suppressing generation of sink marks on a top portion of the key without spoiling woody texture of the key and securing sufficient rigidity of the key, thereby enabling a player to obtain an excellent key touch feeling.

To attain the above object, in a second aspect of the present invention, there is provided a key for a keyboard device, including a key body made of resin, which has at least a top portion and a pair of side portions and extends a predetermined length in a front-rear direction, and at least one or a plurality of woody boards attached along at least part of the pair of side portions of the key body, wherein the key body includes an upper portion protrusion extending along an upper end of each of the pair of side portions and formed continuous with the top portion, the upper portion protrusion protruding in a lateral direction of the key body, wherein the one or each of the woody boards is disposed such that an upper end surface thereof is in contact with a lower surface of the upper portion protrusion, and wherein the upper portion protrusion has a protruding length dimension in the lateral direction smaller than a thickness dimension in a vertical direction.

With this construction, the upper portion protrusion formed continuous with the top portion of the key body extends such that it protrudes in the lateral direction along the upper end of each side portion, and the one or each of the woody boards is disposed such that the upper end surface thereof is in contact with the lower surface of the upper portion protrusion, whereby the upper end surface of the woody board is covered with the upper portion protrusion so as not to be exposed to the outside.

Further, the protruding length dimension of the upper portion protrusion protruding in the lateral direction of the key body is configured to be smaller than the thickness dimension in the vertical direction of the upper portion protrusion. Therefore, when the key body is molded, the difference in the cooling rate becomes difficult to be caused between the continuous portions between the top portion and the side portions of the key body, and the other portions of the key body, whereby it is possible to suppress generation of sink marks on the top portion. Further, with this, even when the thickness dimension of each side portion is not reduced to approximately half the thickness of the top portion, it is possible to suppress generation of sink marks, so that the thickness of each side portion can be set to be larger, whereby it is possible to improve the rigidity of the key. Therefore, according to the present invention, it is possible to provide a key for a keyboard device which is capable of effectively suppressing generation of sink marks on a top portion of the key without spoiling woody texture of the key and securing sufficient rigidity of the key, thereby enabling a player to obtain an excellent key touch feeling.

The above and other objects, features, and advantages of the present invention will become more apparent from the following detailed description taken in conjunction with the accompanying drawings.

BRIEF DESCRIPTION OF THE DRAWINGS

FIGS. 1A and 1B are perspective views of a part (one octave section) of a keyboard device for an electronic piano to which the present invention is applied, in which FIG. 1A shows the appearance of the keyboard device and FIG. 1B shows a state in which keys other than a white key and a black key at a left end of the keyboard device are omitted;

FIGS. 4A and 4B are perspective views of the white key and the key support mechanism therefor, in which FIG. 4A shows the white key and the key support mechanism in a connected state and FIG. 4B shows the white key and the key support mechanism in an exploded state;

FIGS. 5A and 5B are perspective views of the black key and the key support mechanism therefor, in which FIG. 5A shows the black key and the key support mechanism in a connected state and FIG. 5B shows the black key and the key support mechanism in an exploded state;

FIGS. 6A and 6B are views useful in explaining operation of the white key in the keyboard device, in which FIG. 6A shows a key-released state and FIG. 6B shows a key-depressed state;

FIG. 7A and 7B are views useful in explaining operation of the black key in the keyboard device, in which FIG. 7A shows a key-released state and FIG. 7B shows a key-depressed state;

DETAILED DESCRIPTION OF PREFERRED EMBODIMENTS

Figure 1A:
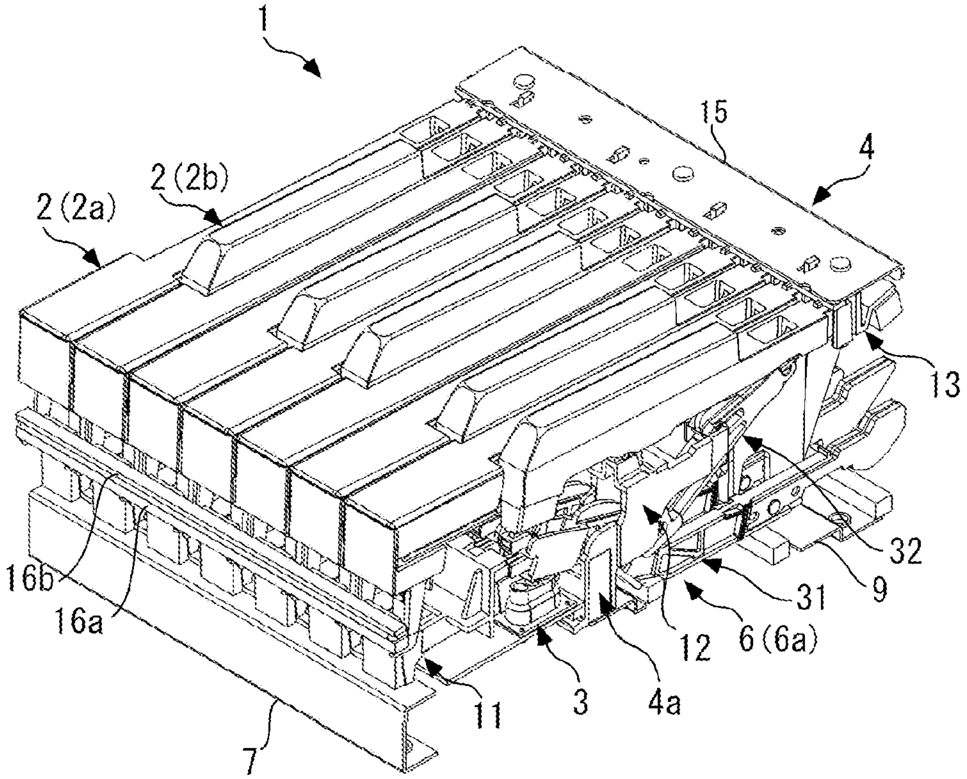

The present invention will now be described in detail with reference to the drawings showing preferred embodiments thereof. FIG. 1A shows only one octave section of a keyboard device 1 for an electronic piano to which the present invention is applied. Note that in the following, a description will be first given of the basic construction of the keyboard device 1 and operation thereof, and then of an essential part of the present invention.

Figure 1B:
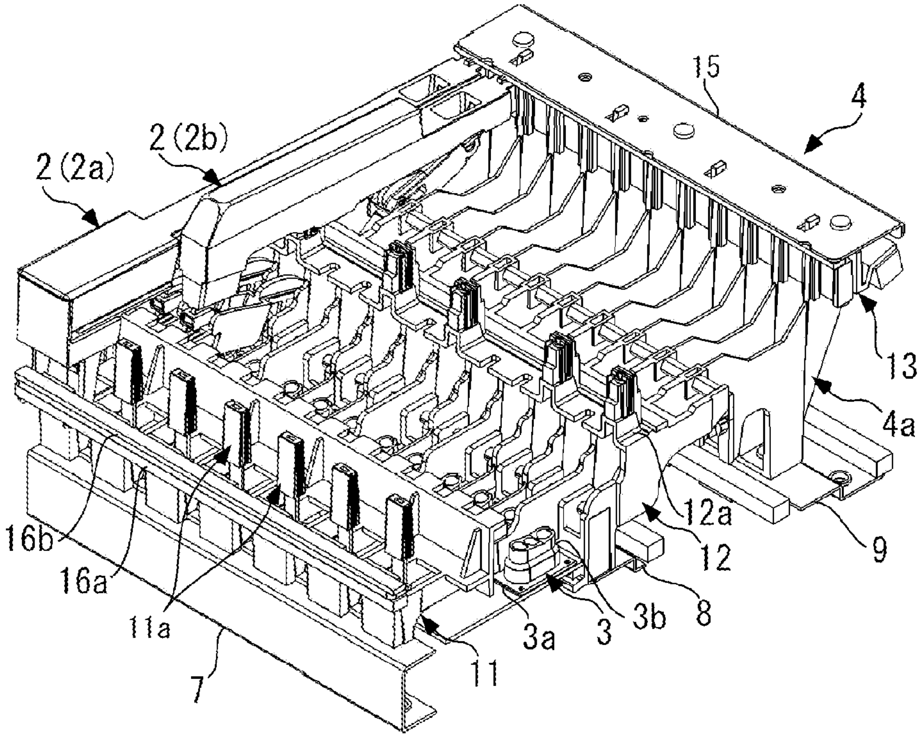
Figure 2:
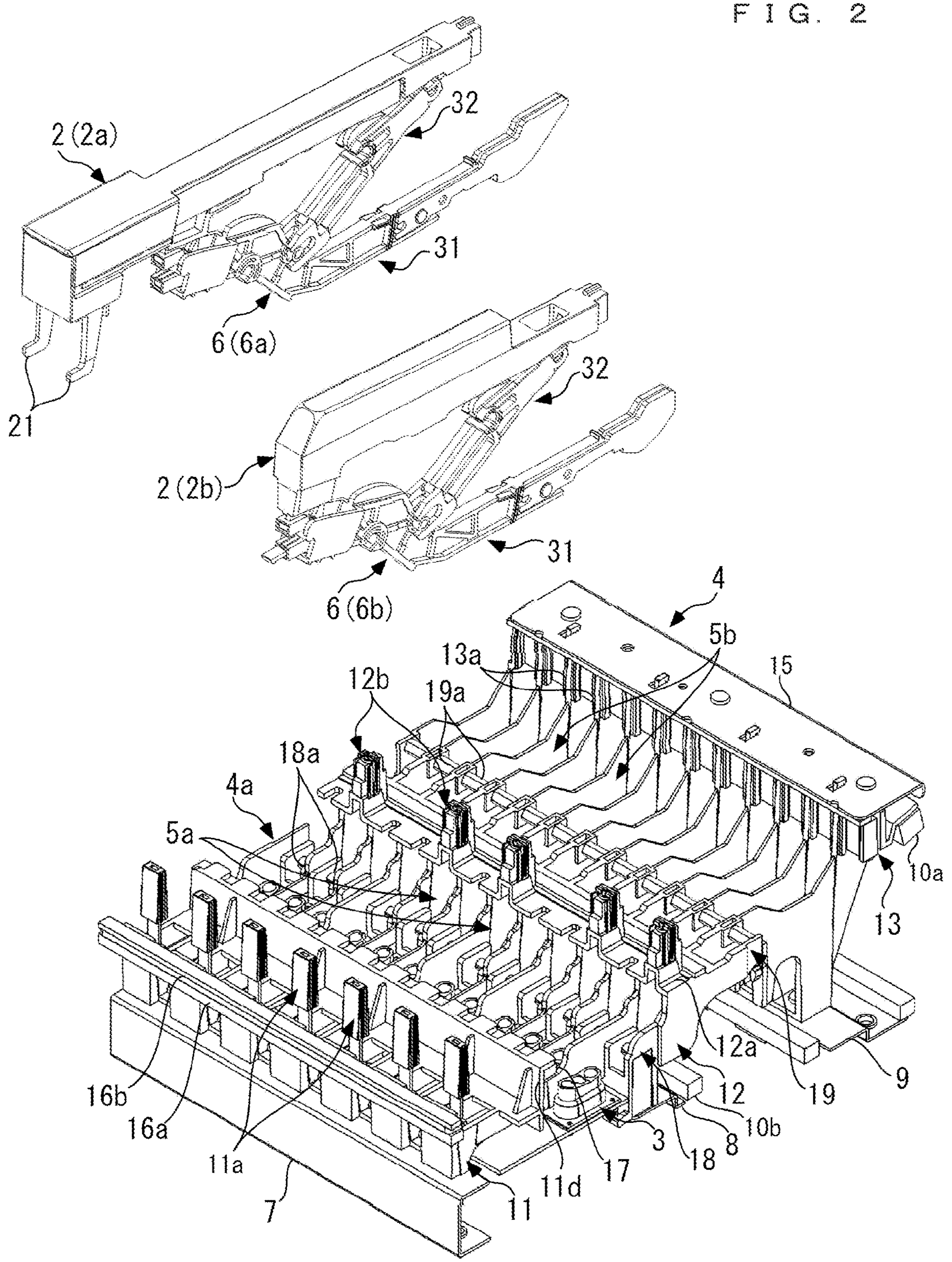
FIG. 2 is a perspective view of the keyboard device shown in FIG. 1B in a state in which the white key and the black key are removed, together with respective key support mechanisms therefor, from a keyboard chassis.

FIG. 1B shows a state of the keyboard device 1 shown in FIG. 1A, in which keys 2 other than a white key 2*a* and a black key 2*b* at the left end of the keyboard device 1 are omitted. FIG. 2 shows a state of the keyboard device 1 shown in FIG. 1B, in which the white key 2*a* and the black key 2*b* are removed, together with respective key support mechanisms 6 therefor, from a keyboard chassis 4.

This keyboard device 1 is comprised of the keyboard chassis 4, the plurality of keys 2 including the white keys 2*a* and the black keys 2*b* and arranged in a state arranged side by side in a left-right direction, the plurality of key support mechanisms 6 each pivotally mounted on the keyboard chassis 4, for supporting an associated one of the keys 2 from below, and key switches 3 each for detecting key depression information of an associated one of the keys 2.

Figure 3A:
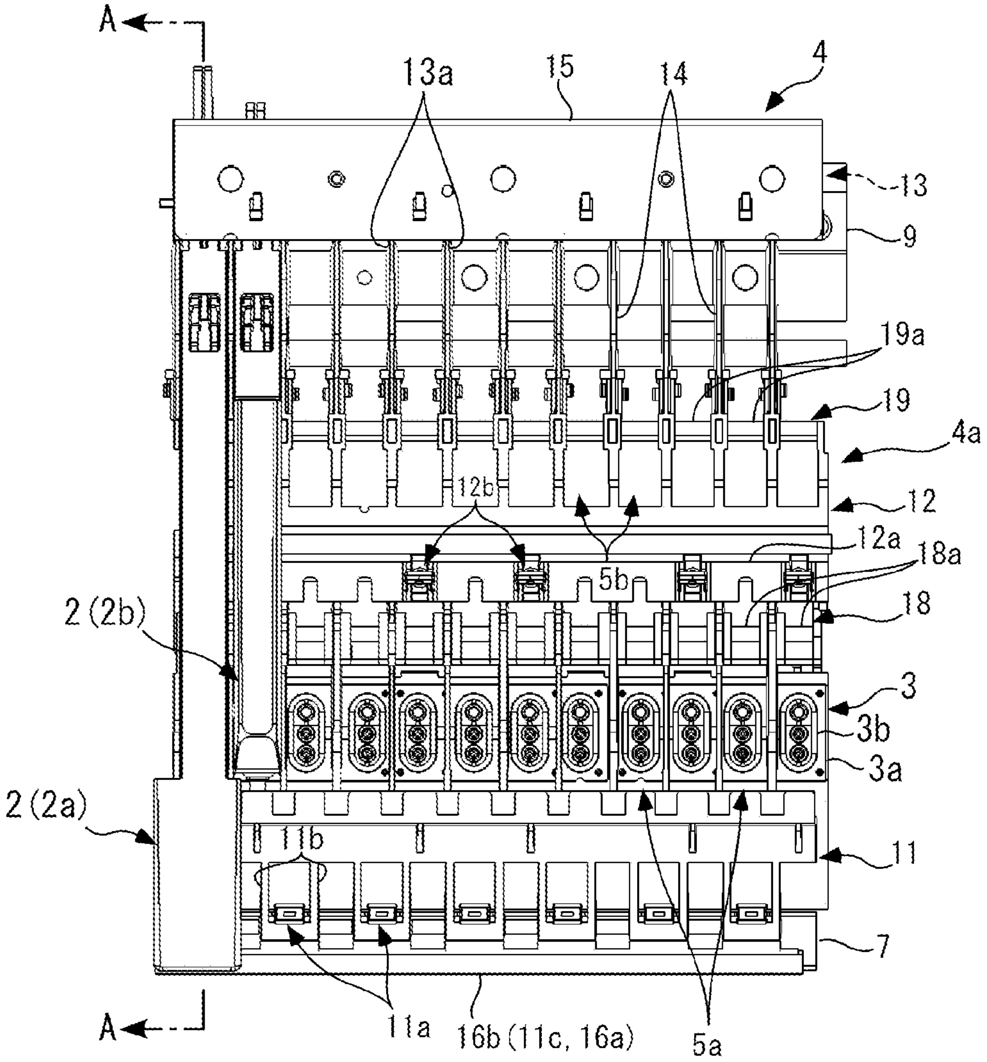
FIG. 3A is a plan view of the keyboard device shown in FIG. 1B
Figure 3B:
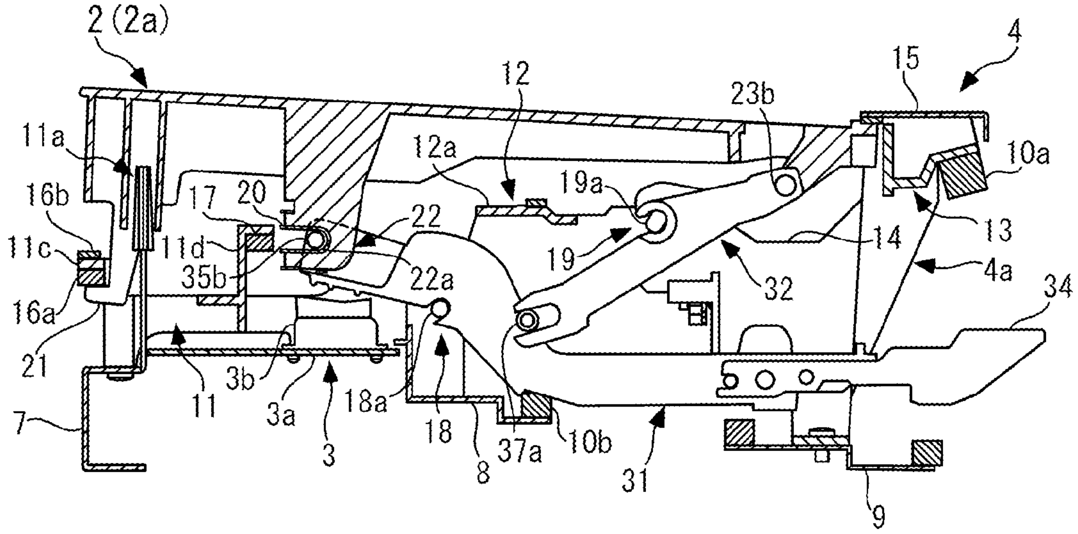
FIG. 3B is a cross-sectional view taken along line A-A of FIG. 3A.

The keyboard chassis 4 includes a chassis body 4*a* formed as a resin molded article which is made e.g. by injection molding of a predetermined resin material (e.g. an ABS resin) into a predetermined shape. As shown in FIGS. 3A and 3B, the chassis body 4*a* has a front portion 11, an intermediate portion 12, and a rear portion 13, each extending in the left-right direction (in a left-right direction as viewed in FIG. 3A) as a whole. The front portion 11, the intermediate portion 12, and the rear portion 13 are integrally formed with each other via a plurality of ribs 14 disposed with a spacing therebetween in the left-right direction and each extending in the front-rear direction. Note that in the following description, the front portion 11, the intermediate portion 12, and the rear portion 13 of the chassis body 4*a* of the keyboard chassis 4 will be referred to as "the chassis front 11", "the chassis intermediate 12", and "the chassis rear 13", respectively.

The chassis front 11 is mainly for guiding the white key 2*a* during depression thereof and restricting the upper limit position and the lower limit position of a front end of the white key 2*a*. On the chassis front 11, there are erected a plurality of white key guides 11*a*, each of which is inserted into each associated one of the white keys 2*a* from below so as to prevent lateral swing of the white key 2*a*, in a state arranged side by side in the left-right direction. Further, the chassis front 11 has engagement holes 11*b* and 11*b*, vertically extending therethrough, which are formed on the left and right sides of each of the white key guides 11*a*, respectively. A pair of left and right upper limit position regulation portions 21 and 21, referred to hereinafter, of the white key 2*a* are engaged with the respective engagement holes 11*b* and 11*b* in a state inserted therethrough. Furthermore, the chassis front 11 has a front end thereof formed with a stopper-mounting portion 11*c* that protrudes forward and extends along the entirety of the chassis body 4*a* in the left-right direction. A key upper limit stopper 16*a* and a key lower limit stopper 16*b* for the white key are mounted on a lower surface and an upper surface of the stopper-mounting portion 11*c*, respectively, such that they extend in the left-right direction. Note that a stopper-mounting portion 11*d* for the black key, which extends along the entirety of the chassis body 4*a* in the left-right direction, is provided at a predetermined location of the chassis front 11, rearward of each white key guide 11*a*, and that a key upper limit stopper 17 for the black key is mounted on the stopper-mounting portion 11*d* such that it extends in the left-right direction.

The chassis intermediate 12 is mainly for guiding the black key 2*b* during depression thereof and swingably supporting a first arm 31 and a second arm 32, described hereinafter, of each of a white key-associated key support mechanism 6*a* and a black key-associated key support mechanism 6*b*. The chassis intermediate 12 has a flat portion 12*a* in the form of a flat plate extending in the left-right direction, and a plurality of black key guides 12*b* erected on the flat portion 12*a* and disposed with an appropriate spacing therebetween in the left-right direction. Each black key guide 12*b* is inserted into an associated one of the black keys 2*b* from below to prevent lateral swing of the black key 2*b*. Further, the chassis intermediate 12 has a front portion thereof provided with a first arm support portion 18 for supporting the first arms 31 of the key support mechanisms 6. The first arm support portion 18 has a plurality of first pivot shafts 18*a* each of which is provided between each adjacent two of the ribs 14 and 14 such that the first pivot shaft 18*a* extends in the left-right direction. The first arms 31 are swingably supported on associated ones of the first pivot shafts 18*a*. Furthermore, the chassis intermediate 12 has a rear portion thereof provided with a second arm support portion 19 for supporting the second arms 32 of the key support mechanisms 6. The second arm support portion 19 has a plurality of second pivot shafts 19*a* each of which is provided between each adjacent two of the ribs 14 and 14 such that the second pivot shaft 19*a* extends in the left-right direction. The plurality of second pivot shafts 19*a* are arranged on the same axis extending in the left-right direction at a location rearward of and higher than the first pivot shafts 18*a*, and the second arms 32 are swingably supported on associated ones of the second pivot shafts 19*a*. Note that a first arm lower limit stopper 10*b* extending along the entirety of the chassis body 4*a* in the left-right direction is provided at a predetermined location of a middle rail 8, referred to hereinafter, disposed below the chassis intermediate 12.

Further, the above-mentioned key switches 3 are provided on a lower portion of the keyboard chassis 4 between the above-described chassis front 11 and chassis intermediate 12. The key switches 3 are formed by a laterally elongated printed circuit board 3*a* extending in the left-right direction, and a plurality of switch bodies 3*b* formed by rubber switches attached to the printed circuit board 3*a* on a key-by-key basis, for being pressed by associated ones of the first arms 31 upon key depression.

The chassis rear 13 is mainly for guiding the keys 2 by their rear ends in the vertical direction while preventing lateral swing of the keys 2 and for restricting the upper limit positions of the rear ends of associated ones of the first arms 31. As shown in FIGS. 2 and 3A, the chassis rear 13 has a plurality of partition walls 13*a* formed with a predetermined spacing therebetween in the left-right direction so as to separate each adjacent two of the keys 2 and 2 from each other. Further, as shown in FIG. 3B, a first arm upper limit stopper 10*a* extending along the entirety of the chassis body 4*a* in the left-right direction is provided at a predetermined location of an upper portion of the chassis rear 13. The first arm upper limit stopper 10*a* and the above-mentioned first arm lower limit stopper 10*b* provided on the chassis intermediate 12 are for restricting the upper limit position and the lower limit position of the first arm 31, respectively, when the first arm 31 having a function as a hammer for adding a touch weight to the key 2 pivotally moves upward and downward. Furthermore, a metal cover plate 15 extending in the left-right direction along the entirety of the chassis body 4*a* and disposed to cover the rear ends of the keys 2 is mounted on the upper portion of the chassis rear 13.

As shown in FIGS. 2 and 3A, the chassis body 4*a* of the keyboard chassis 4 constructed as described above is formed with a plurality of first openings 5*a* open upward and forward and a plurality of second openings 5*b* open upward. The first arms 31 of the key support mechanisms 6 are engaged with associated ones of the first pivot shafts 18*a* from outside via the above-mentioned first openings 5*a*, respectively. Further, the second arms 32 are engaged with associated ones of the second pivot shafts 19*a* from outside via the above-mentioned second openings 5*b*, respectively.

Further, in the above-described keyboard chassis 4, a plurality of chassis bodies 4*a* are connected to each other so as to be arranged side by side in the left-right direction, and are each screwed to a front rail 7, the middle rail 8, and a rear rail 9 in a state placed thereon, the rails 7, 8 and 9 each extending in the left-right direction and arranged with a predetermined spacing therebetween in the front-rear direction. The keyboard chassis 4 is fixed to a keybed, not shown, of the electronic piano via the front rail 7 and the rear rail 9.

Figure 4A:
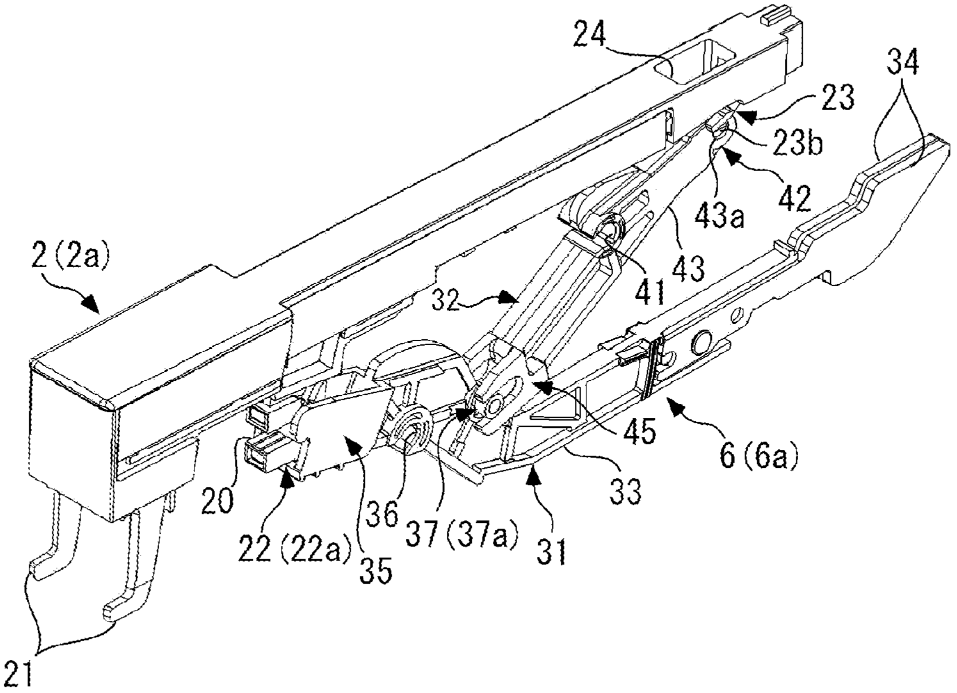
Figure 4B:
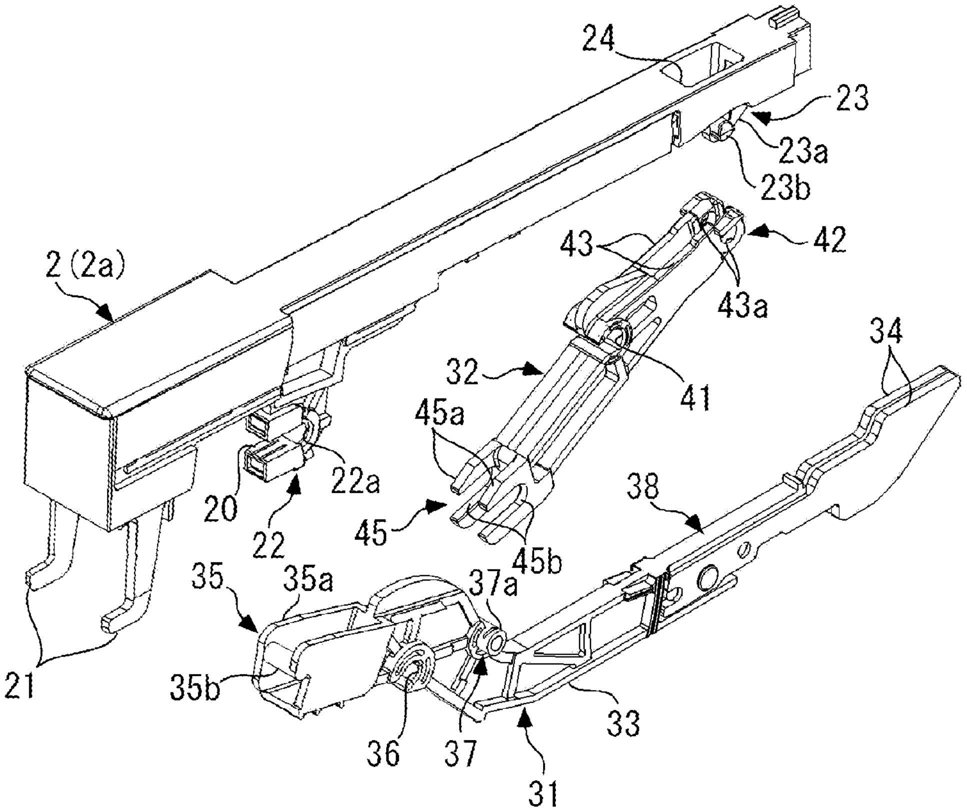

Next, the keys 2 and the key support mechanisms 6 will be described. FIG. 4A shows the white key 2*a* and the key support mechanism 6*a* therefor on an enlarged scale, and FIG. 4B shows them in an exploded state. As shown in FIGS. 4A and 4B, the white key 2*a* is formed e.g. by injection molding of a predetermined resin material (e.g. an AS resin) into a hollow shape which extends a predetermined length in the front-rear direction and opens downward. The white key 2*a* has the front end thereof formed with the pair of left and right upper limit position regulation portions 21 and 21 which protrude downward from respective side walls of the front end of the white key 2*a* and each having a lower end thereof bent forward. As described hereinabove, the left and right upper limit position regulation portions 21 and 21 are engaged with the respective left and right engagement holes 11*b* and 11*b* of the chassis front 11 in a state inserted therethrough.

Further, at a predetermined location of a front portion of the white key 2*a,* rearward of the upper limit position regulation portions 21, there is formed a key front-side connecting portion 22 connected to the first arm 31 of the key support mechanism 6*a.* This key front-side connecting portion 22 includes a connecting recess 22*a* formed into a U shape having a slot-like shape in side view and open forward. Further, the connecting recess 22*a* has a key-side noise suppression member 20 attached thereto, which is formed to cover the whole inner peripheral surface of the connecting recess 22*a,* for suppressing generation of noise when a connecting shaft 35*b,* referred to hereinafter, of the first arm 31 slides in the inner peripheral surface of the connecting recess 22*a*.

Furthermore, the white key 2*a* has a rear portion thereof provided with a key rear-side connecting portion 23 connected to the second arm 32 of the key support mechanism 6*a.* The key rear-side connecting portion 23 has a plate-like connecting body portion 23*a* which hangs downward from a laterally central portion of the white key 2*a* and has a predetermined thickness in the left-right direction, and a pair of left and right engagement protrusions 23*b* and 23*b* which coaxially protrude from the left and right side surfaces of the connecting body portion 23*a,* respectively. Further, the rear portion of the white key 2*a* is formed with a tool insertion hole 24 which vertically extends through the rear portion, and is used to insert a predetermined tool from above for disconnecting the white key 2*a* from the second arm 32 of the key support mechanism 6*a* e.g. for maintenance of the keyboard device 1.

On the other hand, the key support mechanism 6*a* includes the first arm 31 and the second arm 32 which are engaged with each other and are connected to the key front-side connecting portion 22 and the key rear-side connecting portion 23 of the white key 2*a,* respectively.

As shown in FIG. 4B, the first arm 31 is comprised of an arm body 33 and two weights 34 and 34 attached to the arm body 33. The arm body 33 is formed as a resin molded article which is made e.g. by injection molding of a predetermined resin material (e.g. polyacetal resin) into a predetermined shape. This arm body 33 extends a predetermined length in the front-rear direction, and has a front end thereof formed with a first arm front-side connecting portion 35 connected to the key front-side connecting portion 22 of the white key 2*a*. The first arm front-side connecting portion 35 includes a box portion 35*a* having a box-like shape open upward and forward, and the connecting shaft 35*b* provided such that it extends in the left-right direction in a state connecting the front-side upper ends of left and right side walls of the box portion 35*a* to each other. The connecting shaft 35*b* is connected to the connecting recess 22*a* of the key front-side connecting portion 22 of the white key 2*a* such that the connecting shaft 35*b* is pivotally movable and is slidable in the front-rear direction.

Further, the arm body 33 has a bearing portion 36 formed at a predetermined location immediately rearward of the first arm front-side connecting portion 35. The bearing portion 36 has an inverted U shape open downward in side view, and is pivotally engaged with the first pivot shaft 18*a* of the keyboard chassis 4. Furthermore, the arm body 33 has a first arm rear-side connecting portion 37, which is connected to the second arm 32, at a predetermined location rearward of the bearing portion 36. Specifically, the first arm rear-side connecting portion 37 has a connecting shaft 37*a* which extends in the left-right direction with respective opposite ends thereof protruding outward from the left and right side surfaces of the arm body 33. The opposite ends of the connecting shaft 37*a* are engaged with connecting recesses 45*b* and 45*b* of a second arm front-side connecting portion 45, referred to hereinafter, of the second arm 32.

The two weights 34 and 34 formed as elongated and narrow plates are mounted on a weight mounting portion 38, which is a rear portion of the arm body 33, in a state sandwiching the weight mounting portion 38. Note that each weight 34 is made of a material (metal such as iron) having a larger specific gravity than the arm body 33, and is formed e.g. by pressing a metal plate into a predetermined shape.

The second arm 32 is formed as a resin molded article having a predetermined shape by injection molding of the same resin material as that of the arm body 33 of the first arm 31. The second arm 32 is shorter than the first arm 31 and extends a predetermined length in the front-rear direction. Further, the second arm 32 has a bearing portion 41 having a C shape open forward in side view approximately at a longitudinal center thereof. The bearing portion 41 is pivotally engaged with an associated one of the second pivot shafts 19*a* of the keyboard chassis 4.

Further, the second arm 32 has a rear portion thereof provided with a second arm rear-side connecting portion 42 connected to the key rear-side connecting portion 23 of the white key 2*a.* The second arm rear-side connecting portion 42 is formed into a bifurcated shape, and has two left and right connecting arm portions 43 and 43 which extend a predetermined length parallel to each other along the longitudinal direction of the second arm 32. Each connecting arm portion 43 has a rear end thereof formed with a connecting hole 43*a* extending through the connecting arm portion 43 in the left-right direction. The two connecting arm portions 43 and 43 sandwich the connecting body portion 23*a* of the key rear-side connecting portion 23 of the white key 2*a* between the rear ends thereof from the left and the right, and each connecting hole 43*a* has an associated one of the engagement protrusions 23*b* of the key rear-side connecting portion 23 pivotally fitted therein.

Furthermore, the second arm 32 has a front portion thereof provided with the second arm front-side connecting portion 45 connected to the first arm rear-side connecting portion 37 of the first arm 31. The second arm front-side connecting portion 45 has a pair of left and right connecting portions 45*a* and 45*a* arranged with a predetermined spacing in the left-right direction. The connecting portions 45*a* and 45*a* are each formed with the connecting recess 45*b* which has a U shape having a slot-like shape in side view and open forward. The left and right connecting portions 45*a* and 45*a* of the second arm front-side connecting portion 45 are pivotally and slidably engaged with the respective opposite ends of the connecting shaft 37*a* of the first arm 31 via the connecting recesses 45*b* and 45*b* thereof.

Figure 5A:
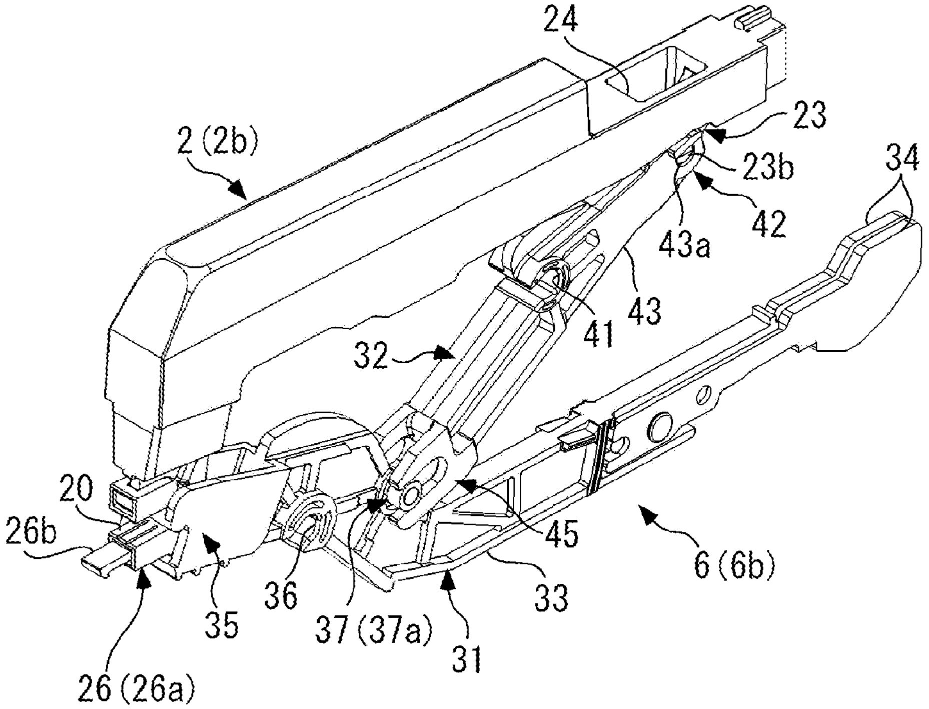
Figure 5B:
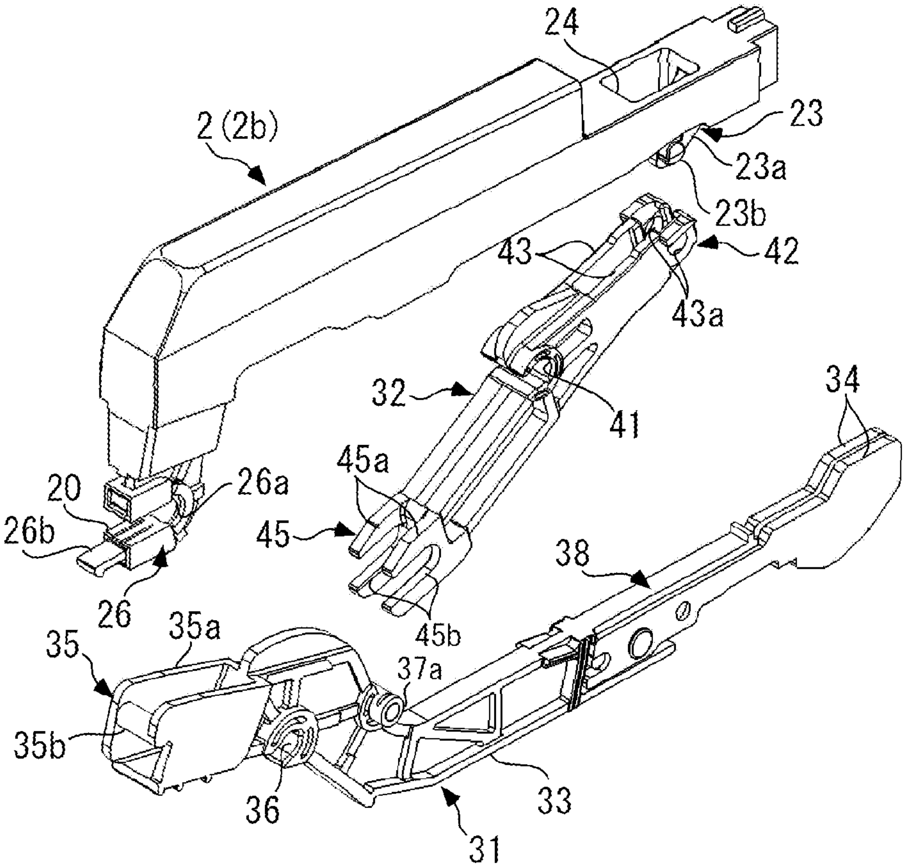

FIG. 5A shows the black key 2*b* and the key support mechanism 6*b* therefor on an enlarged scale, and FIG. 5B shows the black key 2*b* and the key support mechanism 6*b* in an exploded state. The black key 2*b* is formed e.g. by injection molding of the same resin material as that of the white key 2*a* into a hollow shape which extends in the front-rear direction by a predetermined length shorter than that of the white key 2*a* and opens downward. The black key 2*b* has a front-side lower end thereof provided with a key front-side connecting portion 26 formed substantially similar to the key front-side connecting portion 22 of the white key 2*a*. This key front-side connecting portion 26 has a connecting recess 26*a* formed into a U shape having a slot-like shape in side view and open forward. Further, the key front-side connecting portion 26 has an extension portion 26*b* on a lower-side front end of the connecting recess 26*a*. The extension portion 26*b* extends a predetermined length forward of the front surface of the body of the black key 2*b*. This extension portion 26*b* functions as an upper limit position regulation portion of the black key 2*b*. Note that in the following description, the components of the black key 2*b* and the key support mechanism 6*b* having the same configurations as those of the above-described white key 2*a* and key support mechanism 6*a* are denoted by the same reference numerals and detailed description thereof will be omitted.

The key support mechanism 6*b* supporting the black key 2*b* is constructed substantially similar to the above-described white key-associated key support mechanism 6*a*. Specifically, the arm body 33 of the first arm 31 of the key support mechanism 6*b* and the second arm 32 of the same are constructed exactly similar in shape and size to the arm body 33 and the second arm 32 of the white key-associated key support mechanism 6*a*. Note that two left and right weights 34 and 34 of the black key-associated key support mechanism 6*b* differ from the weights 34 of the white key-associated key support mechanism 6*a* in the shape of the rear portion thereof.

Figure 6A:
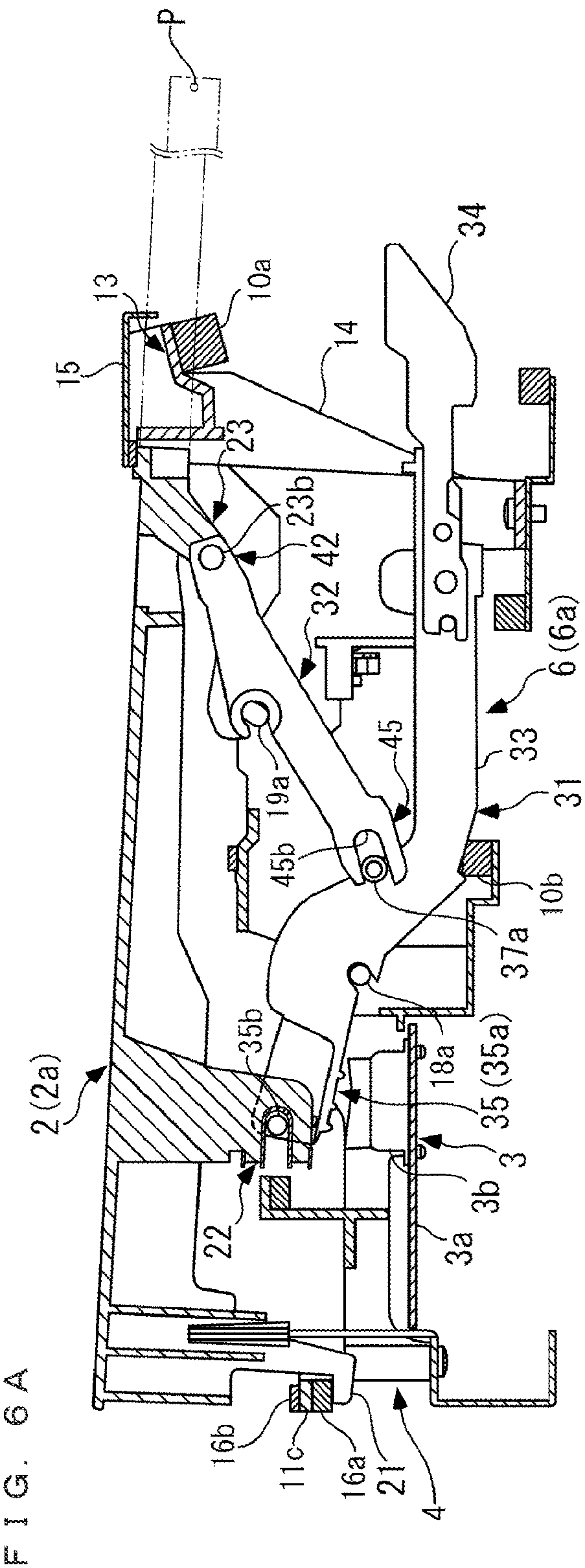
Figure 6B:
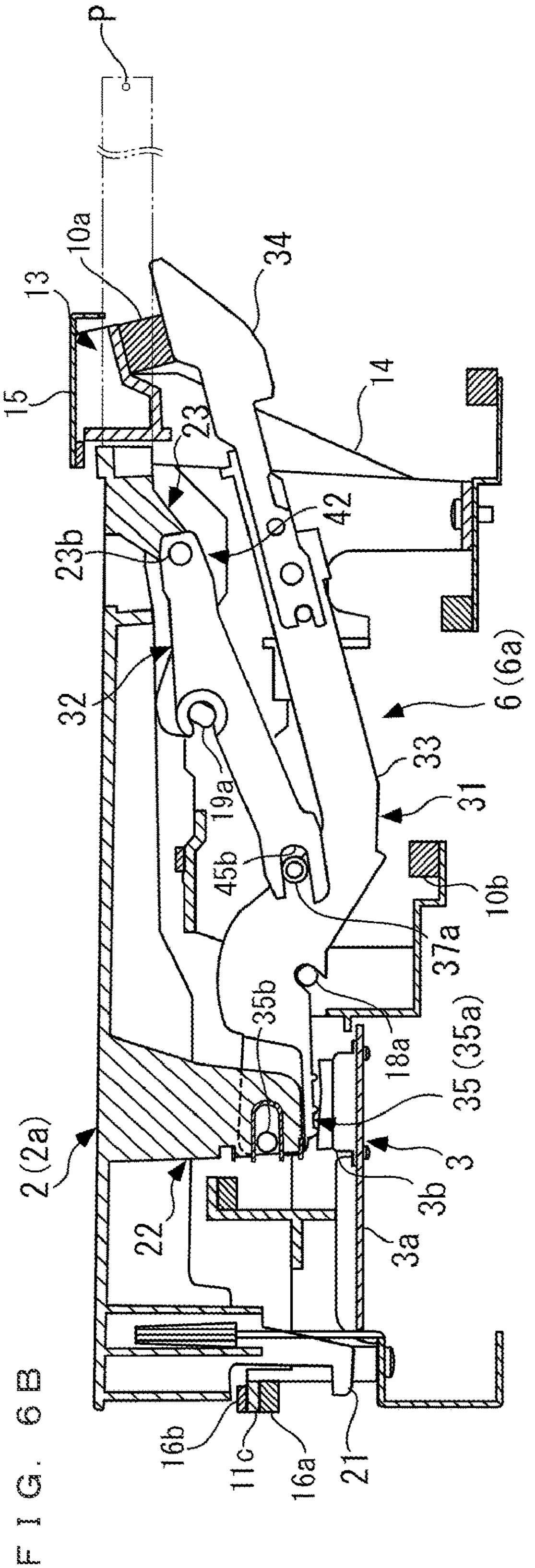
Figure 7A:
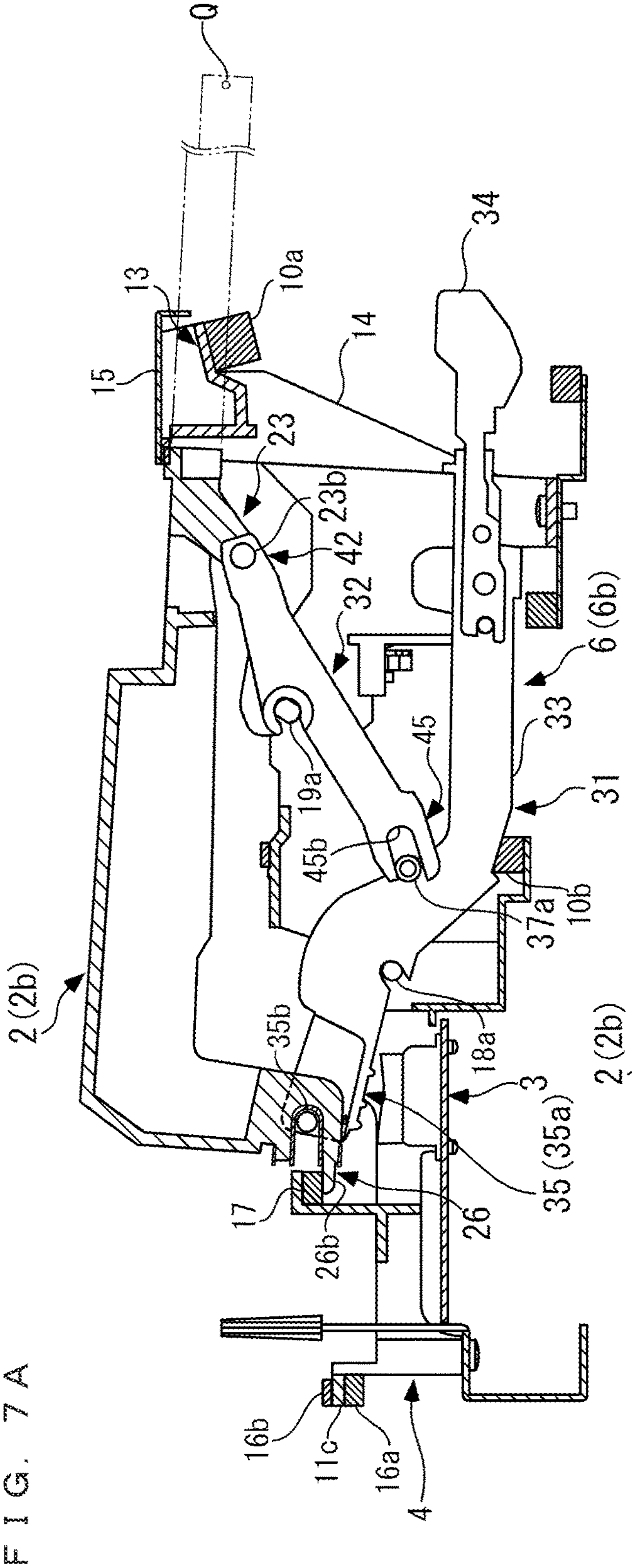
Figure 7B:
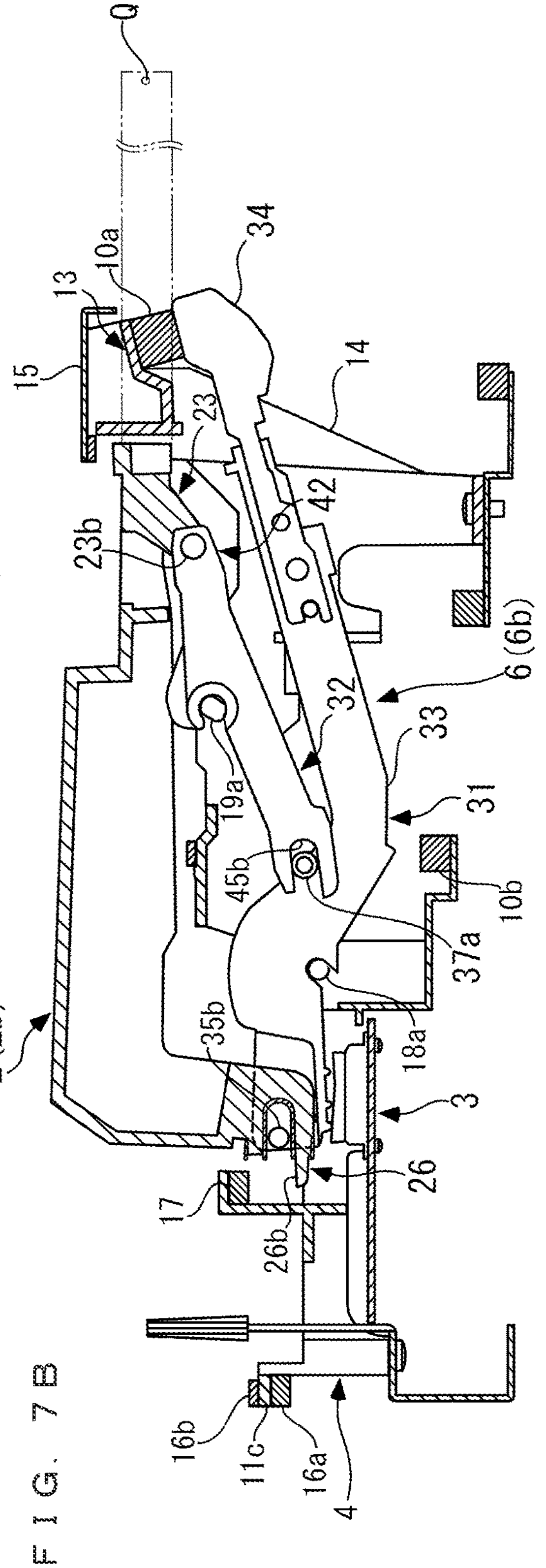

Next, a description will be given of the operation of the keys 2 and the key support mechanisms 6 of the keyboard device 1 constructed as described above. FIGS. 6A and 6B are views useful in explaining the operation of the white key 2*a* and the key support mechanism 6*a* associated therewith. FIGS. 7A and 7B are views useful in explaining the operation of the black key 2*b* and the key support mechanism 6*b* associated therewith.

When the front end of the white key 2*a* is depressed by a player with his/her finger from a key-released state shown in FIG. 6A, the key front-side connecting portion 22 of the white key 2*a* is moved downward, whereby the first arm 31 is pivotally moved in a counterclockwise direction about the first pivot shaft 18*a*. Further, in accordance with the pivotal movement of the first arm 31, the second arm front-side connecting portion 45, which is engaged with the connecting shaft 37*a* of the first arm 31 via the connecting recesses 45*b* and 45*b,* is moved upward. With this, the second arm 32 is pivotally moved in a clockwise direction about the second pivot shaft 19*a*. Then, in accordance with this pivotal movement of the second arm 32, the key rear-side connecting portion 23, which is connected to the second arm 32 via the second arm rear-side connecting portion 42 formed at the rear end of the second arm 32, is pulled down, whereby the rear end of the white key 2*a* is moved downward.

Note that during the above-mentioned pivotal movement of the first arm 31, the box portion 35*a* of the first arm front-side connecting portion 35 is moved downward, and accordingly, the switch body 3*b* of one of the key switches 3, which is associated with the depressed key 2, is pressed from above by the bottom wall of the box portion 35*a*. As a consequence, in the electronic piano, key depression information of the depressed key 2 is detected, and based on the detected key depression information, sound is generated from a speaker, not shown.

As described hereinabove, in the case where the white key 2*a* is depressed, in accordance with the counterclockwise pivotal movement of the first arm 31, the weight 34 of the first arm 31 is inclined such that the weight 34 becomes higher as it extends rearward, whereby the rear end of the weight 34 is brought into contact with the first arm upper limit stopper 10*a* from below, as shown in FIG. 6B. This prevents further pivotal movement of the first arm 31. When the front end of the white key 2*a* is depressed to its lowest position, the front end of the white key 2*a* is brought into contact with the key lower limit stopper 16*b,* which blocks further depression of the white key 2*a*.

The white key 2*a* depressed as above operates such that it pivotally moves about a virtual pivot P located rearward of the rear end thereof. The location of the virtual pivot P is set such that a distance from the front end of the white key 2*a* is approximately twice as long as the length of the white key 2*a* itself, for example. With this, when the front end of the white key 2*a* is depressed to the lowest position, compared with the case where the white key 2*a* is in the key-released state shown in FIG. 6A, the front end of the white key 2*a* is positioned lower by a predetermined key stroke (e.g. 10 mm) and the rear end of the white key 2*a* is located lower by a distance (e.g. 5 mm) which is approximately half of the predetermined key stroke.

On the other hand, when the finger is released from the white key 2*a* being depressed, the first arm 31 of the key support mechanism 6*a* pivotally moves in a direction opposite to the above-mentioned direction, by the own weight of the weight 34, and in accordance therewith, the second arm 32 as well pivotally moves in a direction opposite to the above-mentioned direction. In accordance with this pivotal movement of the second arm 32, the white key 2*a* pivotally moves upward about the virtual pivot P. Then, a predetermined portion of the first arm 31, rearward of the first pivot shaft 18*a,* moves into contact with the first arm lower limit stopper 10*b* from above, and both of the upper limit position regulation portions 21 and 21 of the white key 2*a* move into contact with the key upper limit stopper 16*a* from below, whereby further pivotal movement of the white key 2*a* is blocked and the white key 2*a* returns to its original key-released state.

Further, when the black key 2*b* is depressed, operations are performed similar to the above-described operations of the white key 2*a* and the key support mechanism 6*a*. More specifically, when a front end of the black key 2*b* is depressed from a key-released state shown in FIG. 7A, the first arm 31 is pivotally moved in the counterclockwise direction about the first pivot shaft 18*a,* and the second arm 32 is pivotally moved in the clockwise direction about the second pivot shaft 19*a*. With this, the black key 2*b* is operated such that it is pivotally moved about a virtual pivot Q located rearward of the rear end thereof. Note that similar to the above-mentioned virtual pivot P of the white key 2*a,* the location of the virtual pivot Q is set such that a distance from the front end of the black key 2*b* is approximately twice as long as the length of the black key 2*b* itself, for example. Therefore, when the front end of the black key 2*b* is depressed to its lowest position, compared with a case where the black key 2*b* is in the key-released state shown in FIG. 7A, the front end of the black key 2*b* is positioned lower by a predetermined key stroke and the rear end thereof is positioned lower by a distance which is approximately half of the predetermined key stroke.

On the other hand, when the finger is released from the black key 2*b* having been depressed, the first arm 31 and the second arm 32 of the key support mechanism 6*b* pivotally move in respective directions opposite to the above-mentioned directions, and in accordance therewith, the black key 2*b* pivotally moves upward about the virtual pivot Q. Then, the extension portion 26*b* of the key front-side connecting portion 26 of the black key 2*b* moves into contact with the key upper limit stopper 17 from below, whereby further pivotal movement of the black key 2*b* is blocked, and the black key 2*b* returns to its original key-released state.

Next, the essential part of the present invention will be described with reference to FIGS. 8 to 9B. The essential part of the present invention is the structure of a top portion and side portions of the key body which has woody boards attached to the side portions, and components therearound. Although in the present embodiment, a description will be given of an example in which the structure is applied to a white key, the same structure may be applied to a black key.

Figure 8:
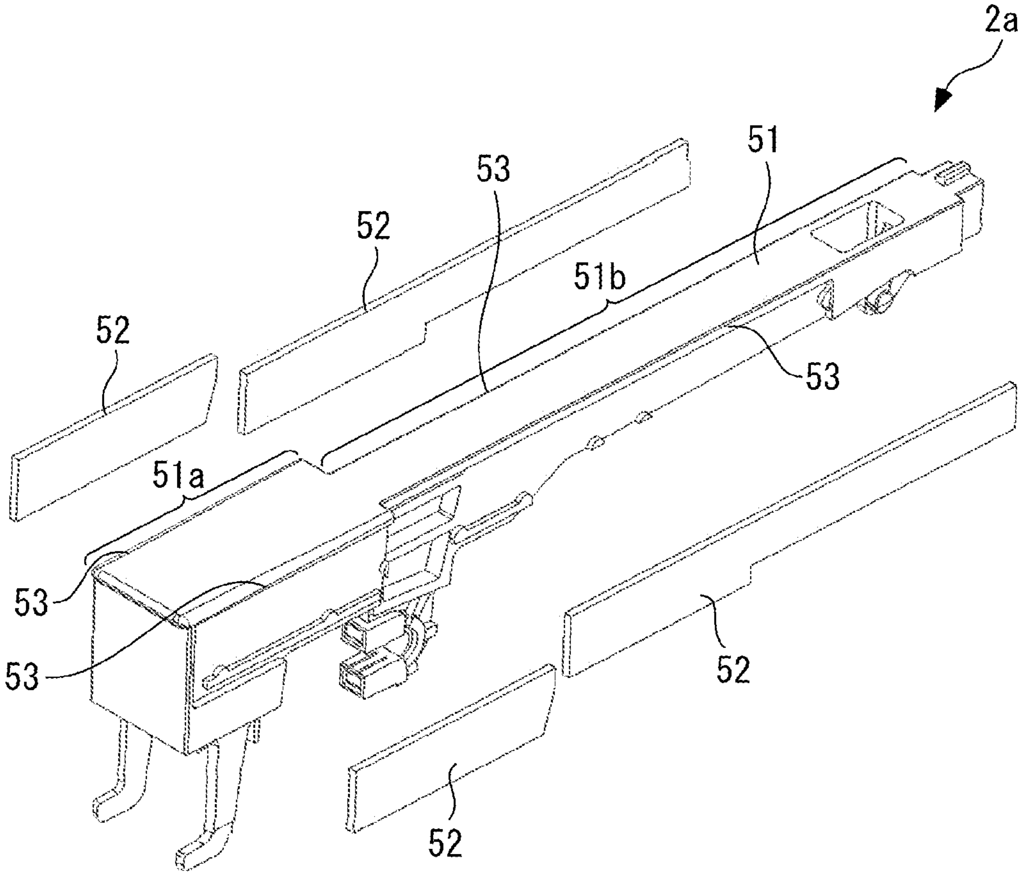
FIG. 8 is a perspective view of a key body itself of the white key and woody boards attached to sides of the key body.

FIG. 8 shows the key body itself of the white key and the woody boards attached to the side portions of the key body. As described hereinabove, the key body, denoted by reference numeral 51, of the white key 2*a* is formed by injection molding of a predetermined resin material (e.g. an AS resin). The white key 2*a* of the present embodiment is e.g. an A key (key for the tone of 1*a*), and the key body 51 of the white key 2*a* is comprised of a large width portion 51*a* adjacent to another white key 2*a*, and a small width portion 51*b* adjacent to one of the black keys 2*b*. The woody boards, denoted by reference numeral 52, are attached to the left and right side portions of the large width portion 51*a* and small width portion 51*b*, respectively. Woody materials, including not only wood materials but also wood-grain decorative boards, plywood boards, medium density fiberboards (MDF), and so forth, can be used for the woody boards 52. In the present embodiment, a soft wood material with a specific gravity of 0.5 or less is used for the woody boards 52. Examples of such wood materials include spruce and predetermined tropical wood.

The woody boards 52 are made uniformly approximately equal in thicknesses to the dimension of a protruding length dimension L3 of upper portion protrusions 53, referred to hereinafter, of the key body 51 protruding in a lateral direction thereof. As described hereinafter, in the present embodiment, this dimension is set to approximately 1.8 mm. Thus, the upper portion protrusions 53 and the woody boards 52 are made flush with each other, whereby it is possible to impart an excellent appearance similar to that of a wooden key to the appearance of the key as viewed laterally.

Figure 9A:
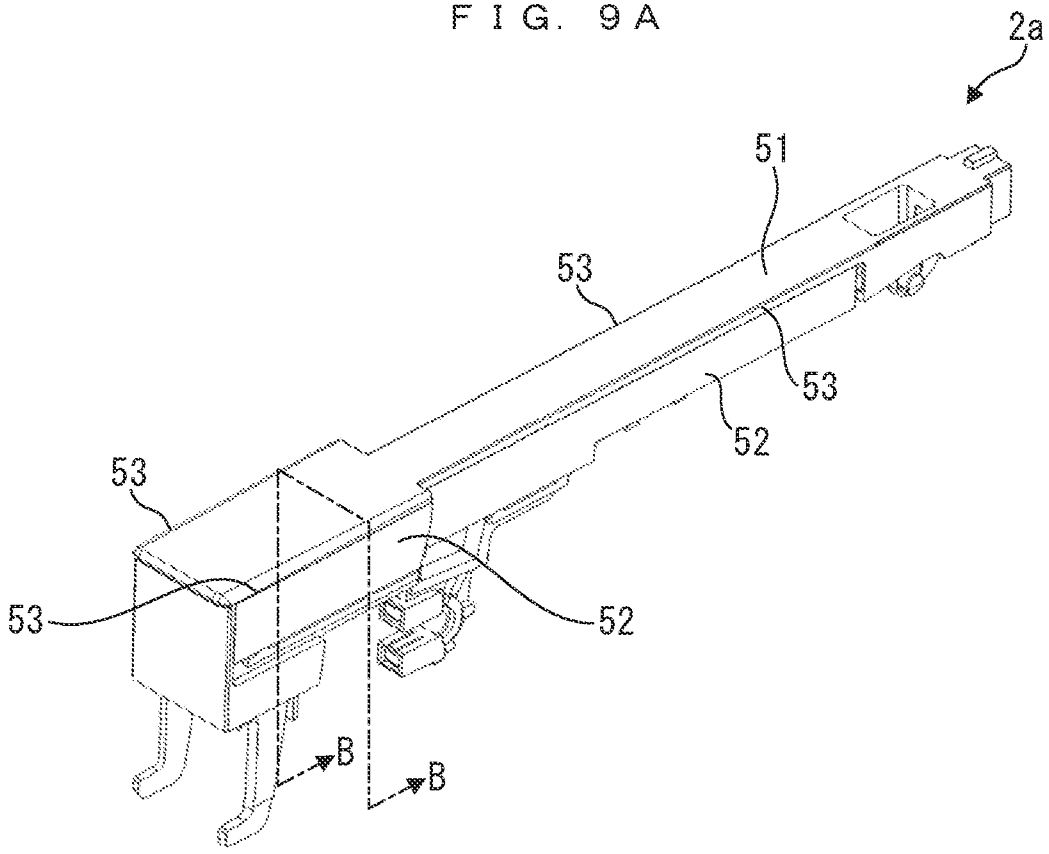
FIG. 9A is a perspective view of the key body of the white key in a state in which the woody boards are attached to the key body.

FIG. 9A shows the key body 51 of the white key 2*a* in a state in which the woody boards 52 are attached to the key body 51. As shown in FIGS. 8 and 9A, the respective upper ends of the side portions of the key body 51 are formed with the upper portion protrusions 53 protruding in the lateral direction of the key body 51. In the present embodiment, the upper portion protrusions 53 are formed on the left and right side portions of each of the large width portion 51*a* and the small width portion 51*b*. The upper portion protrusions 53 are formed continuous with the top portion of the key body 51, and extend along the respective upper ends of the side portions of the large width portion 51*a* and the small width portion 51*b*.

Figure 9B:
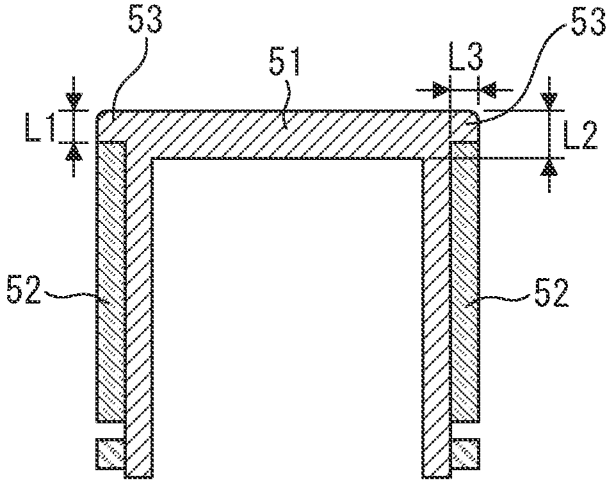
FIG. 9B is a cross-sectional view taken along line B-B of FIG. 9A.

FIG. 9B is a cross-sectional view taken along line B-B of FIG. 9A. As shown in FIG. 9B, the woody boards 52 are attached to the key body 51 such that upper end surfaces thereof are in contact with lower surfaces of the upper portion protrusions 53 without substantially any gap therebetween. With this, the upper end surfaces of the woody boards 52 are covered with the upper portion protrusions 53 such that the upper end surfaces cannot be visually recognized from outside.

In the key body 51 as a molded article of a resin material, it is necessary to pay attention to generation of sink marks on portions, such as continuous portions between the top portion and the side portions of the key body 51, which are thicker than the other portions. Particularly, the top portion of the key body 51 provides a surface hit by a finger of a player at the time of key depression during musical performance of the player, and hence to prevent degradation of the appearance and the touch feeling of the white key 2*a*, it is important to effectively suppress generation of sink marks on the top portion of the key body 51. To suppress such generation of sink marks on the top portion of the key body 51, it is effective to reduce the thickness of the side portions of the key body 51 to approximately half the thickness of the top portion of the key body 51 to thereby make a cooling rate difference difficult to be caused during molding of the key body 51. This, however, causes a problem that the thickness of the side portions becomes insufficient and the rigidity of the key is reduced, causing degradation of key touch feeling.

To solve the above-mentioned problem, the key body 51 of the present embodiment is characterized in that a thickness dimension L1 in the vertical direction of the upper portion protrusions 53 is made different from a thickness dimension L2 of the top portion of the key body 51. The key body 51 is formed such that the thickness dimension L1 of the upper portion protrusions 53 is smaller than the thickness dimension L2 of the top portion. Hereinafter, this point will be described in detail.

First, the thickness dimension L1 in the vertical direction of the upper portion protrusions 53 is set to such a thickness that the appearance of the key as viewed laterally resembles the appearance of a wooden key, thanks to a combination of the upper portion protrusions 53 and the woody boards 52. In the present embodiment, the thickness dimension L1 of the upper portion protrusions 53 is set to approximately 2 mm such that the key resembles a key of a wooden keyboard of a normal acoustic piano.

On the other hand, as described hereinabove, the thickness dimension L2 of the top portion of the key body 51 is configured to be larger than the thickness dimension L1 of the upper portion protrusions 53. By making the thickness dimension L2 of the top portion larger than the thickness dimension L1, even when it is required, as a countermeasure of generation of sink marks, to reduce the thickness of the side portions of the key body 51 to approximately half the thickness dimension L2 of the top portion of the key body 51, it is possible to secure a certain thickness of the side portions, and it is possible to secure sufficient rigidity of the whole key.

Further, since the thickness dimension L1 of the upper portion protrusions 53 is smaller than the thickness dimension L2 of the top portion, the key body 51 is also advantageous in that during molding thereof, the cooling rate difference between the continuous portions between the top portion and the side portions of the key body 51, and the other portions of the key body 51 is reduced. This makes it possible to further suppress generation of sink marks on the top portion of the key body 51. In the present embodiment, the thickness dimension L2 of the top portion is set to approximately 2.8 mm.

Further, the key body 51 of the present embodiment is also characterized in that the key body 51 is formed such that the protruding length dimension L3 of the upper portion protrusions 53 protruding in the lateral direction of the key body 51 is smaller than the thickness dimension L1 of the upper portion protrusions 53. With this configuration, when the key body 51 is molded, the cooling rate difference is difficult to be caused between the continuous portions between the top portion and the side portions of the key body 51, and the other portions of the key body 51, whereby it is possible to suppress generation of sink marks on the top portion of the key body 51. Further, with this, even when the thickness of the side portions is not reduced to approximately half the thickness dimension L2 of the top portion, it is possible to suppress generation of sink marks, so that the thickness dimension of the side portions can be set to be larger, whereby it is possible to improve the rigidity of the key. In the present embodiment, the protruding length dimension L3 of the upper portion protrusions 53 is set to approximately 1.8 mm.

As described hereinabove, according to the present embodiment, since the key body 51 is formed such that the thickness dimension L1 of the upper portion protrusions 53 is smaller than the thickness dimension L2 of the top portion, it is possible to impart an excellent appearance similar to that of a wooden key to the appearance of the key as viewed laterally. At the same time, by increasing the thickness dimension L2 of the top portion, it is possible to secure a certain thickness of the side portions, and it is possible to secure sufficient rigidity of the whole key.

Further, the key body 51 is formed such that the protruding length dimension L3 of the upper portion protrusions 53 protruding in the lateral direction of the key body 51 is smaller than the thickness dimension L1 of the upper portion protrusions 53, whereby it is possible to suppress generation of sink marks on the top portion. Further, since the thickness of the side portions can be set to be larger, it is possible to improve the rigidity of the key.

Therefore, according to the present embodiment, it is possible to provide a key for a keyboard device which is capable of effectively suppressing generation of sink marks on a top portion of the key without spoiling woody texture of the key and securing sufficient rigidity of the key, thereby enabling a player to obtain an excellent key touch feeling.

Note that the present invention is not limited to the above-described embodiment, but it can be practiced in various forms. For example, although in the above-described embodiment, the key body 51 is formed with configurations that the thickness dimension L1 of the upper portion protrusions 53 is smaller than the thickness dimension L2 of the top portion, and that the protruding length dimension L3 of the upper portion protrusions 53 protruding in the lateral direction of the key body 51 is smaller than the thickness dimension L1 of the upper portion protrusions 53, it is also possible to employ only one of these configurations.

It is further understood by those skilled in the art that the foregoing are preferred embodiments of the invention, and that various changes and modifications may be made without departing from the spirit and scope thereof.

What is claimed is:

1. A key for a keyboard device, including a key body made of resin, which has at least a top portion and a pair of side portions and extends a predetermined length in a front-rear direction, and at least one or a plurality of woody boards attached along at least part of the pair of side portions of the key body, wherein the key body comprises an upper portion protrusion extending along an upper end of each of the pair of side portions and formed continuous with the top portion, the upper portion protrusion protruding in a lateral direction of the key body, wherein the one or each of the woody boards is disposed such that an upper end surface thereof is in contact with a lower surface of the upper portion protrusion, and wherein the upper portion protrusion has a thickness dimension in a vertical direction smaller than a thickness dimension of the top portion of the key body.

2. A key for a keyboard device, including a key body made of resin, which has at least a top portion and a pair of side portions and extends a predetermined length in a front-rear direction, and at least one or a plurality of woody boards attached along at least part of the pair of side portions of the key body, wherein the key body comprises an upper portion protrusion extending along an upper end of each of the pair of side portions and formed continuous with the top portion, the upper portion protrusion protruding in a lateral direction of the key body, wherein the one or each of the woody boards is disposed such that an upper end surface thereof is in contact with a lower surface of the upper portion protrusion, and wherein the upper portion protrusion has a protruding length dimension in the lateral direction smaller than a thickness dimension in a vertical direction.

* * * * *